(12) United States Patent
Stuck

(10) Patent No.: US 12,668,366 B2
(45) Date of Patent: Jun. 30, 2026

(54) DUCT ADAPTER SYSTEM FOR MOUNTING AN ION GENERATOR UNIT UPON AN AIR AIRCRAFT AIR CIRCULATION SYSTEM

(71) Applicant: Eric Stuck, Newnan, GA (US)

(72) Inventor: Eric Stuck, Newnan, GA (US)

( * ) Notice: Subject to any disclaimer, the term of this patent is extended or adjusted under 35 U.S.C. 154(b) by 613 days.

(21) Appl. No.: 18/098,821

(22) Filed: Jan. 19, 2023

(65) Prior Publication Data

US 2024/0246680 A1 Jul. 25, 2024

(51) Int. Cl.
B64D 13/06 (2006.01)
(52) U.S. Cl.
CPC ........ B64D 13/06 (2013.01); *B64D 2013/067* (2013.01)

(58) Field of Classification Search
CPC ........ B01D 46/00; B01D 46/52; B64D 13/06; B64D 2013/067; A61L 9/22; F24F 13/02; F24F 8/30; H01T 23/00
See application file for complete search history.

(56) References Cited

U.S. PATENT DOCUMENTS 10,173,410 B2 * 1/2019 Nardiello ................ B29C 64/30
2023/0069269 A1 * 3/2023 Lehman ................... F16L 25/14

* cited by examiner

*Primary Examiner* — Sharon Pregler

(57) ABSTRACT

An air aircraft air circulation system including a duct adapter system for mounting an ion generator unit upon the exterior surface of a conduit of an air circulation system to dispose electrodes projecting from the housing of the ion generator into the interior of the conduit, and preferably having material clearance between the electrodes and the housing, between the electrodes the duct adaptor, and between the electrodes and the conduit.

7 Claims, 3 Drawing Sheets

DUCT ADAPTER SYSTEM FOR MOUNTING AN ION GENERATOR UNIT UPON AN AIR AIRCRAFT AIR CIRCULATION SYSTEM

BACKGROUND

Field of the Invention

The present invention is directed to apparatus and methods for mounting an ion generator unit upon the exterior surface of a conduit of the air circulation system of an aircraft or other human transportation vessel and/or vehicle.

The air aircraft air circulation system includes a duct adapter system for mounting an ion generator unit upon the exterior surface of a conduit of an air circulation system, to dispose electrodes projecting from the housing of the ion generator into the interior of the conduit, and preferably having material clearance between the electrodes and the housing, between the electrodes the duct adaptor, and between the electrodes and the conduit.

Description of Related Art

Needlepoint dual-polar ionization is a highly effective technology to combat pathogens such as bacteria, viruses (including Covid-19), mold, odors, smoke, and volatile organic compounds (VOC's), including jet fuel, engine oil, and hydraulic fluid and the like.

Dual-polar ionization technology greatly improves the air quality in aircraft interiors by replicating nature's air cleaning processes, giving the passenger a more enjoyable travel experience, greater comfort, safety, and peace of mind.

Needlepoint dual-polar ionization technology dos so by various processes. For example, crashing waves at the beach or at a waterfall generate tens of thousands of ions per cubic centimeter each second. Similarly, high in the mountains or when a thunderstorm is nearby, massive numbers of ions are generated, thus cleaning and freshening the air.

Accordingly, it is one object of the present invention to improve performance, durability, and ease of use in aircraft, cruise line and other installations, as well as to reduce costs, and most importantly to combat viruses, bacteria, odors, volatile organic compounds (VOCs), mold, smoke, and dust.

The prior art has proposed various structures and methods as airborne ion distribution systems. The stated prior art goal has been to purify the air, for example within the passenger areas of aircraft and other human transportation vessels and vehicles, for the health and safety of passengers as well as the crew, and to prepare the aircraft to be ready for flight as quickly as possible without sacrificing the primary goal of providing a heathy and safe environment for passengers and the crew.

These systems have been proposed to provide an immediate clean, safe, and healthy interior in aircraft, by eliminating odors, viruses, pathogens, and allergens. In attempting to accomplish these goals, such prior art systems have been integrated into the existing air control system of an aircraft or other human transportation vessels and vehicles, and thus to circulate the processed air through the passenger and crew compartments.

Prior art systems may have met with some degree of success within the industry. One such prior art system, as exemplified by U.S. Pat. Nos. 10,786,818; 10,974,256; and 11,141,740 is directed to a materially different structure. This prior art system utilizes a probe seat that is permanently attached to the sleeves of the electrodes that extend therefrom. The probe seat is permanently attached to and carries the electrodes, and is rotatable for selective attachment to the conduit, thereby to change the relative positioning of the electrodes within the conduit.

However, such prior art devices and methods have had a number of defects and deficiencies, which are substantially ameliorated by the present invention.

SUMMARY OF THE INVENTION

In one preferred example or embodiment, the present invention is directed to an air aircraft air circulation system which may be the air circulation system of an aviation aircraft or other vehicle or vessel, and includes a duct adapter system for mounting an ion generator unit upon the exterior surface of a conduit of the air circulation system. The ion generator unit has electrodes projecting from the housing thereof for disposition into the interior of the conduit.

In such preferred embodiments, the duct adapter system includes an upper bracket having an upper surface for interfacing with the housing of the air circulation system and a lower surface for mating disposition upon the conduit. The upper bracket has apertures for projecting disposition therethrough of the electrodes and into the conduit of the air circulation system.

According to one such preferred embodiment of the present invention, an associated lower bracket is disposed around the lower portion of the conduit and connected to said upper bracket for securing the upper bracket upon the conduit.

According to this embodiment of the present invention, means are included for connecting said upper and lower brackets and for securing the upper bracket upon the conduit, thereby to maintain the position of the electrodes within the conduit.

According to yet another embodiment of the present invention, the duct adapter may preferably be constructed of a fire-retardant material, and which may comprise carbon fiber or other suitable material.

According to yet another embodiment of the present invention, the carbon fiber comprises 3-D printed carbon fiber.

According to these and other embodiments of the present invention, the upper and lower brackets may include tabs laterally projecting therefrom, and such tabs are preferably laterally projecting tabs that are secured together by means of bolts.

According to yet another embodiment of the present invention, at least one stabilizing bracket may preferably be spaced longitudinally from the upper bracket, and is to be disposed between and stationarily connected to (i) the housing of the ion generator unit and (ii) rests upon the exterior surface of the conduit, thereby to securely dispose the stabilizing bracket about the circumference of the conduit.

According to yet another embodiment of the present invention, the ion generator unit has electrodes projecting from its housing to dispose the electrodes into the interior of the conduit.

Other such embodiments are contemplated as being within the scope of the present invention.

BRIEF DESCRIPTION OF THE DRAWING

Various examples are described herein in conjunction with the following figures, wherein.

DETAILED DESCRIPTION OF PREFERRED EMBODIMENTS

Figure 1:
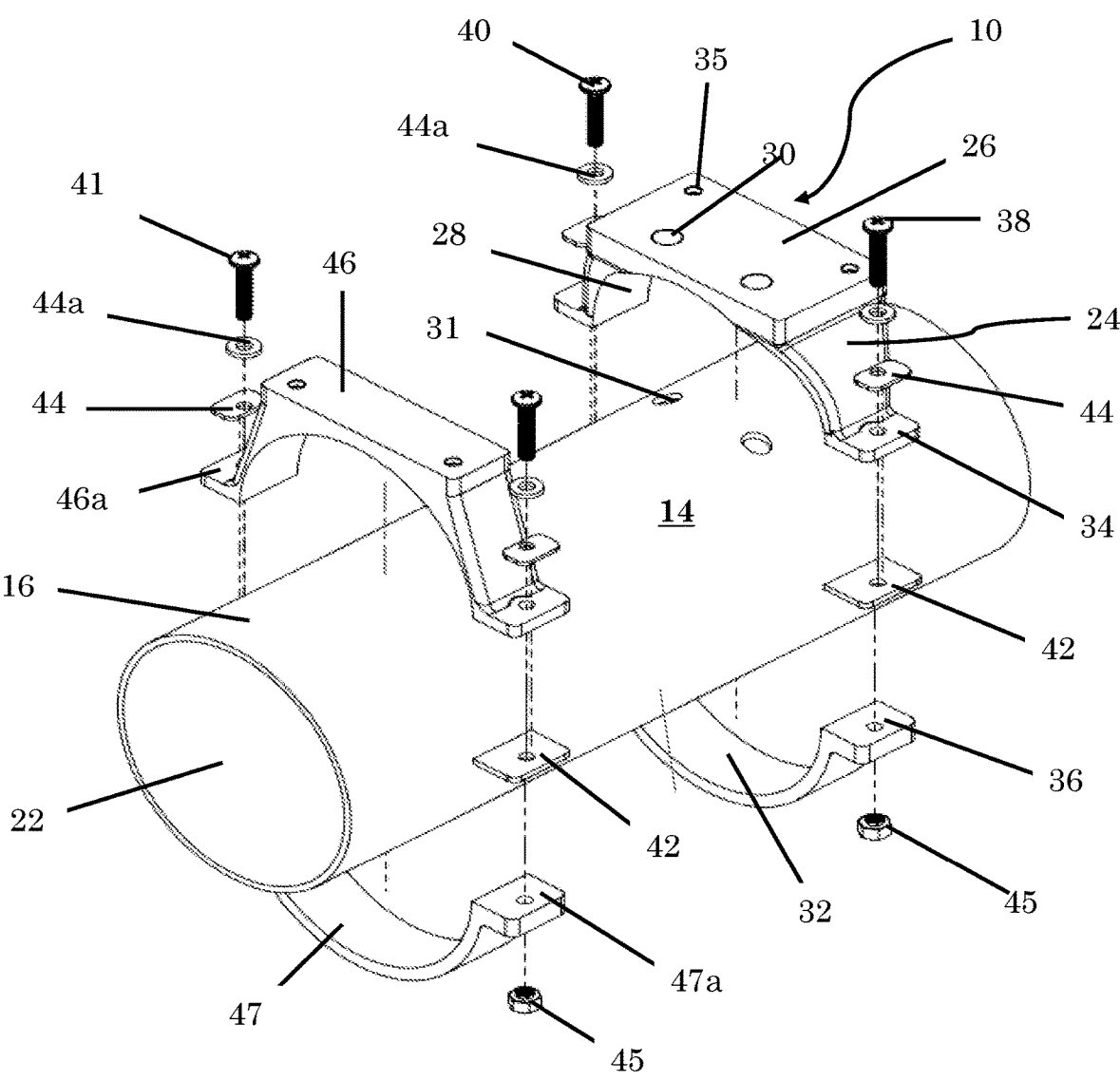
FIG. 1 is an exploded perspective view of a preferred embodiment of the present invention, showing the duct adapter system for mounting an ion generator unit (not shown) upon the exterior surface of a conduit of an air aircraft air circulation system.
Figure 2:
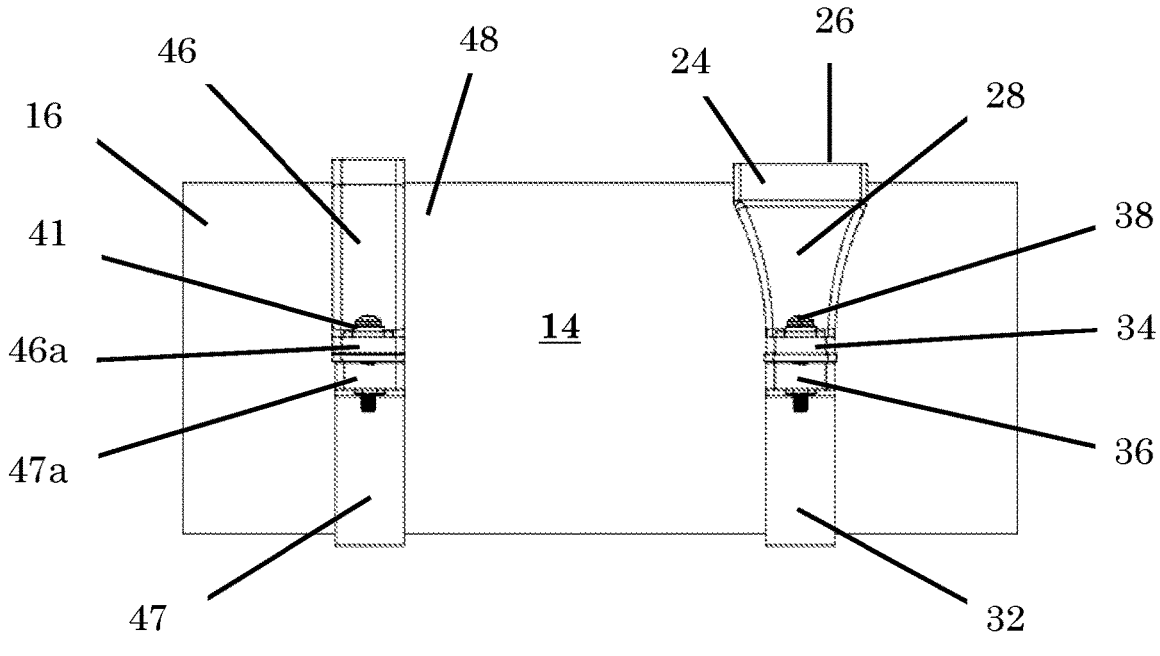
FIG. 2 is a side view of a preferred embodiment of the present invention, showing the duct adapter system of the present invention for mounting an ion generator unit upon the exterior surface of a conduit of an air circulation system.
Figure 3:
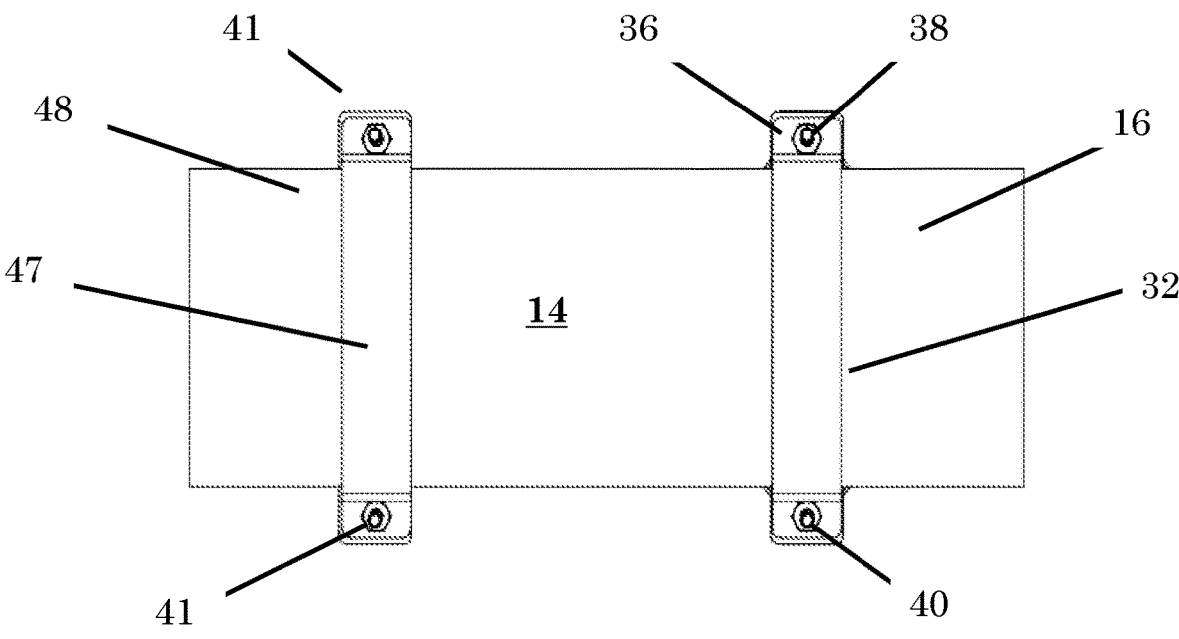
FIG. 3 is a bottom view of a preferred embodiment of the present invention, showing the duct adapter system of the present invention for mounting an ion generator unit upon the exterior surface of a conduit of an air aircraft air circulation system.

This invention hereof may take many different forms. The drawings and the description of the invention detail several preferred embodiments of the invention. It should be understood that the present disclosure is to be considered as but an example of the principles of the invention. The disclosure is not intended to limit the broad aspect of the invention to the embodiments illustrated.

Referring now to the FIGS. 1-5 hereof, in one illustrative preferred example or embodiment, a duct adapter system generally 10 for mounting an ion generator unit generally 12 upon the exterior surface 14 of a conduit 16 of an air circulation system of an aircraft or other vessel or vehicle for human transportation is shown. The ion generator unit 12 has ion emitter probes 18,18 projecting perpendicularly away from the housing 20 thereof for disposition into the interior 22 of the conduit 16.

The duct adapter system 10 of the present invention may preferably comprise an upper bracket 24 having an upper surface 26 for interfacing with a lower plate 21 of housing 20 of the air circulation system and a lower surface 28 for disposition upon conduit 16. Lower plate 21 is secured to upper surface 26 having bolt holes 35 therein by means of bolts 33. Upper bracket 24 has apertures 30,30 for projecting disposition therethrough of ion emitter probes 18,18, and thus into interior 22 of conduit 16 of the air aircraft air circulation system.

In preferred embodiments, there is material clearance between apertures 30,30 of upper bracket 24 and the ion emitter probes 18,18. Corresponding apertures 31 in conduit 16 may also preferably have a material space clearance between the walls of such apertures and the ion emitters 18,18 that are disposed therethrough.

In these and other embodiments, a lower bracket 32 is disposed circumferentially about conduit 16 and connected to upper bracket 24 for securing upper bracket 24 upon conduit 16. Upper and lower brackets 24,32 are secured together and secured upon conduit 16 via connectors, as are known in the art, such as bolts, thereby to maintain the position of electrodes 18,18 within interior 22 of conduit 16.

Upper and lower brackets 24,32 include respective tabs 34,36 laterally projecting therefrom, and such laterally projecting tabs 34,36 are secured together by means of respective bolts 38,40. Shims 42, washers 44,44a and locknuts 45 may be appropriately used in preferring embodiments, as shown.

Upper and lower duct brackets 24,32 are preferably constructed of a fire-retardant material, which may comprise carbon fiber, and wherein the carbon fiber may comprise 3-D printed carbon fiber.

Further preferred embodiments comprise at least one stabilizing bracket comprising upper stabilizing bracket 46 and lower stabilizing bracket 47 that are respectively spaced longitudinally from upper and lower brackets 24,32. Upper stabilizing bracket stationarily connects housing 20 of the ion generator unit to the exterior surface 14 of conduit 16. Specifically, upper stabilizing bracket 46 is secured to lower plate 21 of housing 20 by means of bolts 49.

Stabilizing brackets 46,47 are connected by means of bolts 41,41 disposed through corresponding tabs 46a, 47a, and thus are securely disposed about the circumference 48 of conduit 16.

Upper bracket 24 has an upper surface 50 for interfacing with housing 20 of the air circulation system and a lower surface 52 for disposition upon conduit 16, and with the upper bracket 24 having apertures 54 for projecting disposition therethrough of the electrode sleeves 56,56 of the ion emitter probes 18,18.

A sealing gasket may be disposed between lower surface 52 and the exterior surface of conduit 16. The ion emitter probes 18,18 include projecting electrode tips 58,58. Accordingly, the ion emitter probes 18,18 are operationally disposed withing the interior 22 of conduit 16 of the air circulation system.

Figure 4:
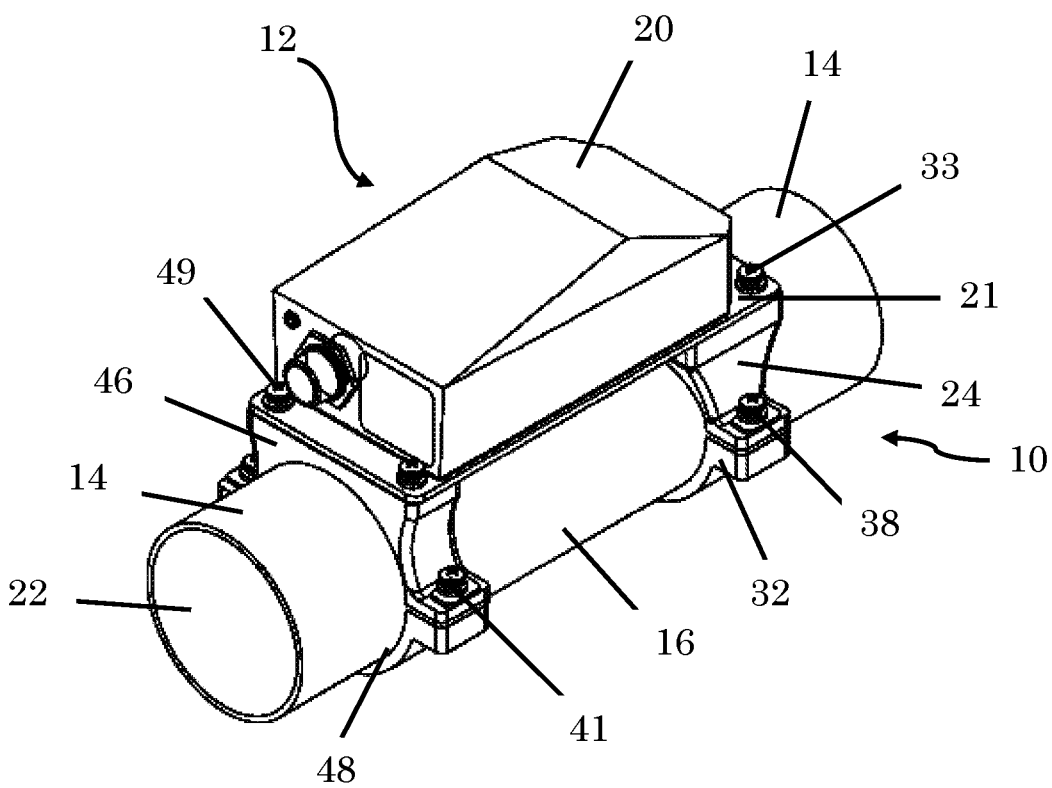
FIG. 4 is a perspective view of a preferred embodiment of the present invention, showing the ion generator unit for use with the duct adapter system of the present invention, as installed upon the exterior surface of a conduit of an air circulation system, and further showing the electrodes as disposed within the interior of the air circulation conduit.
Figure 5:
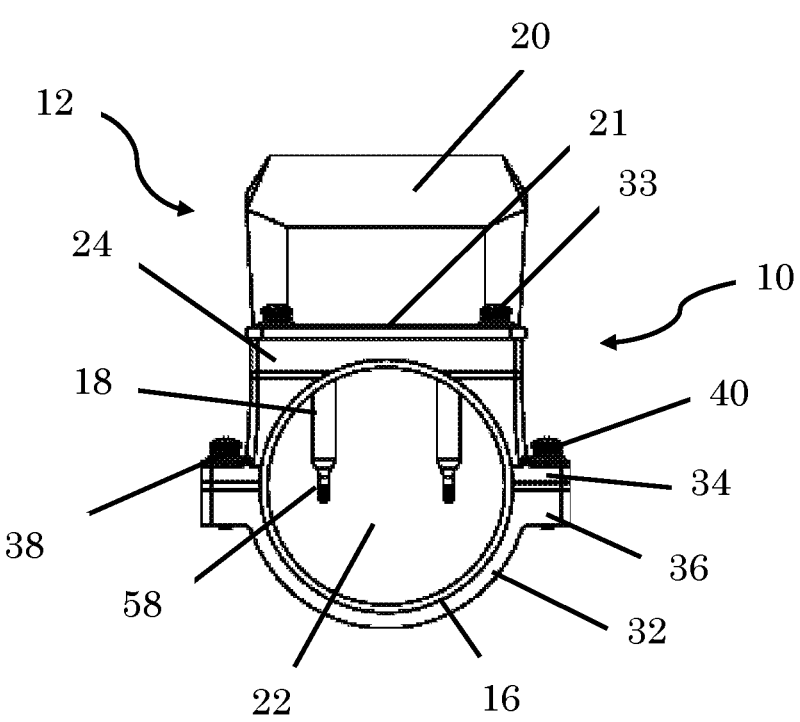
FIG. 5 is a longitudinal end view of a preferred embodiment of the present invention, showing the ion generator unit operationally attached to and mounted upon of the duct adapter system of the present invention, which duct adapter system is installed upon the exterior surface of a conduit of an air circulation system, and yet further showing the electrodes as disposed within the interior of the conduit.

In such embodiments are shown in the Figs. hereof, the duct mounting system 10 of the present invention is used in connection with a dual-polar ion generator designed to be mounted to the conduit 16 of an aircraft's environmental control system (ECS) ductwork with the dual electrodes, as shown particular in FIGS. 4-5 with ion emitter probes 18, 18 inserted into the ECS duct(s). The ions are then carried through the ECS ducts and dispersed into the aircraft's cabin and flight deck where they carry out their mission to destroy pathogens and other environmental cabin air contaminants.

As shown, the present duct adapter invention is directed preferably to carbon fiber reinforced ECS duct adapters 24,32 which are designed for installation of associated ionization systems and facilitate ease of installation, saving time and cost. The duct adapters 24,32 can be manufactured in many sizes to fit various ECS duct diameters and can also be made in various shapes for non-circular ducts.

One embodiment of the present invention is commercially known as the "i7000A" environmental control system (ECS). One preferred and enabling ion generator unit for use in connection with comprises the "12 i3350G Vulcan and i3700G Howitzer" ground-use ion generator/air mover units, which are ideally suited for operators who wish to treat the air within their aircraft interiors with dual-polar ionization, but do not yet have an aircraft installed ion generation system on-board. Thus, aircraft interiors can be treated in as little as one hour with the ground-use systems hereof.

Wherefore, with the advent of the preferred i7000A environmental control system (ECS) duct mounted aircraft units, along with the i3550G and i3700G ground use units, the purposes, goals and objects of the present invention have been substantially and materially accomplished.

Commercial embodiments of the present invention are suitable for retrofitting in the form of an installation kit, Model i1000CF Carbon Fiber Reinforced ECS Duct Adapter Kit Product Specification Sheet DO-160G, which has been federally qualified in March of 2022.

One such preferred embodiment is the "3D Printed Carbon Fiber Fly Away Duct Adapter", which is constructed with Mark forged Onyx-FR-A and CCF-A (i.e., 3D printed fire-retardant carbon fiber composite and carbon fiber reinforcement). Accordingly, the present invention is operational at temperatures of −40 C to +70 C.

Reference in the specification to, "embodiments", "examples," "various examples," "some examples," etc. means that a particular feature, structure, or characteristic described in connection with the examples is to be included in at least one example of the invention. The appearances of the above-referenced phrases in various places in the specification do not necessarily all refer to the same example. Reference to examples is intended to disclose examples, rather than to limit the claimed invention. While the present invention has been particularly shown and described with reference to several such examples, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as, for example, details of the system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not necessary to be provided herein.

It can be appreciated that, in some examples of the present methods and systems disclosed herein, a single component can be replaced by multiple components, and multiple components replaced by a single component.

Except where such substitution would not be operative to practice the present methods and systems, such substitution is within the scope of the present disclosure. Examples presented herein, including operational and/or commercial examples, are intended to illustrate potential implementations of the present method and system examples. It can be appreciated that such examples are intended primarily for purposes of illustration. No particular aspect(s) of the example method, product, and/or system examples described herein is intended to limit the scope of the present disclosure.

These descriptions and representations are the means used by those skilled in the art to convey the substance of their work most effectively to others skilled in the art. A method is here, and generally, conceived to be a sequence of actions (instructions) leading to a desired result. The actions are those requiring physical manipulations of physical quantities. The present disclosure also relates to certain apparatuses for performing the operations herein.

Specific embodiments have been illustrated and described. Numerous modifications may come to mind without significantly departing from the spirit of the invention. Accordingly, the scope of patent coverage and protection is only limited by the scope of the subsequent Claims, as properly construed.

What is claimed is:

1. A duct adapter system for mounting an ion generator unit upon a conduit of an air circulation system, wherein the air circulation system is selected from the group consisting of:

(a) the air circulation system of an aviation air aircraft;

(b) the air circulation system of a vessel used for human transportation; and (c) the air circulation system of a vehicle used for human transportation;

the ion generator unit having ion emitter probes projecting exteriorly thereof for disposition through probe-sized apertures in the conduit of the air circulating system, and thus into the interior of the conduit, said duct adapter system comprising:

an upper bracket constructed of a fire-retardant, rigid material and having an upper surface for static, immobile disposition of the ion generator unit with respect to the conduit and a lower surface matingly disposed upon a portion of the circumference of the exterior surface only of the conduit, said upper bracket having probe-sized apertures closely mating with the probe-sized apertures of the conduit, for projecting disposition therethrough of the ion emitter probes and into the conduit of the air circulation system;

a lower bracket constructed of a fire-retardant, rigid material disposed around the remaining portion of the circumference of the exterior surface of the conduit and connected to said upper bracket for securing the upper bracket circumferentially about the conduit; and means for connecting said upper and lower brackets and for securing the upper bracket circumferentially about the conduit thereby to maintain the position of the ion emitter probes within the conduit.

2. The duct adapter system of claim 1, wherein said fire retardant material comprises carbon fiber.

3. The duct adapter system of claim 2, wherein said carbon fiber comprises 3-D printed carbon fiber.

4. The duct adapter system of claim 1, wherein said upper and lower brackets include tabs laterally projecting therefrom.

5. The duct adapter system of claim 4, wherein said tabs comprise laterally projecting tabs that are secured together by means of at least one bolt.

6. The duct adapter system of claim 1, further comprising at least one stabi- lizing bracket spaced longitudinally from said upper bracket and said lower bracket and stationarily connecting the housing of the ion generator unit with the exterior surface of the conduit.

7. The duct adapter system of claim 6, wherein the stabilizing bracket is securely disposed about the circumference of the conduit.

* * * * *